UNITED STATES PATENT OFFICE.

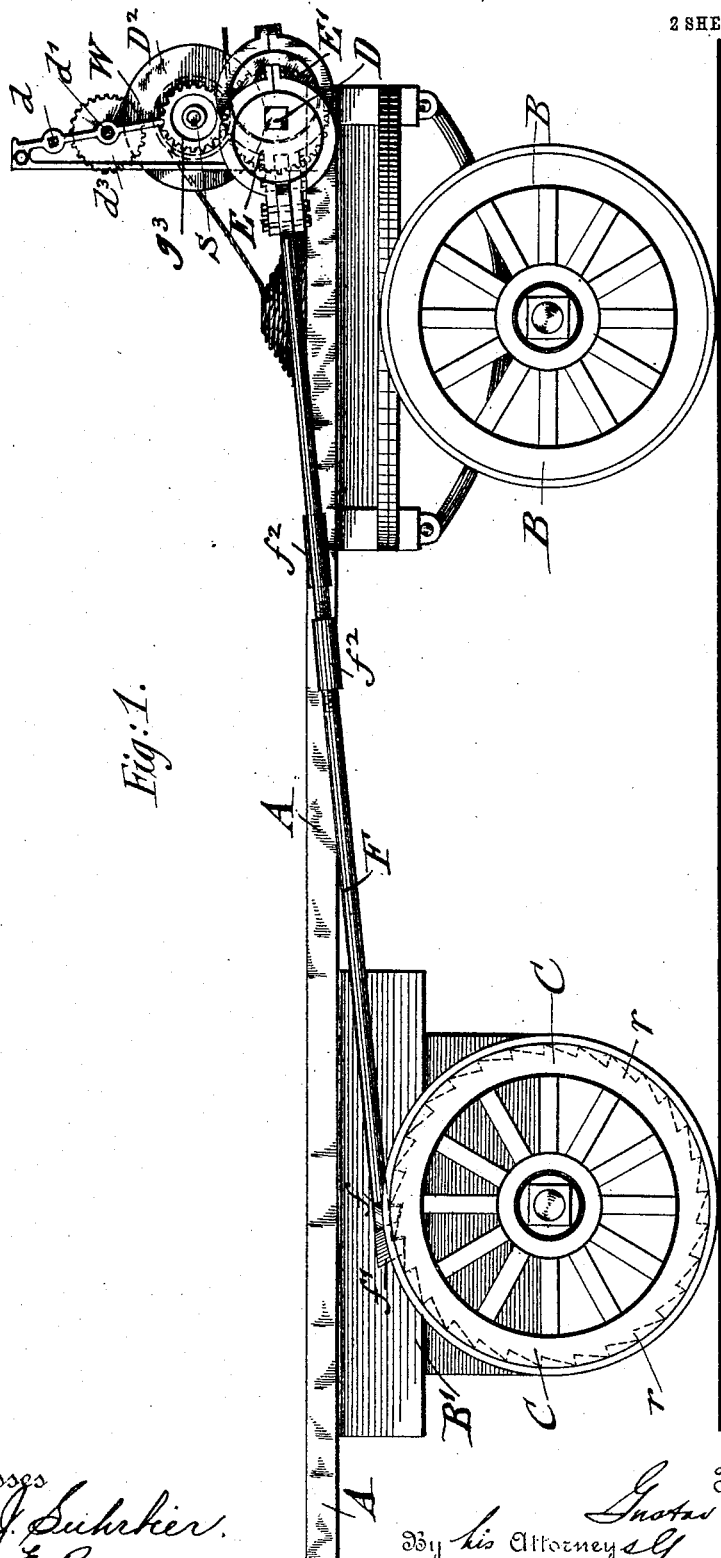

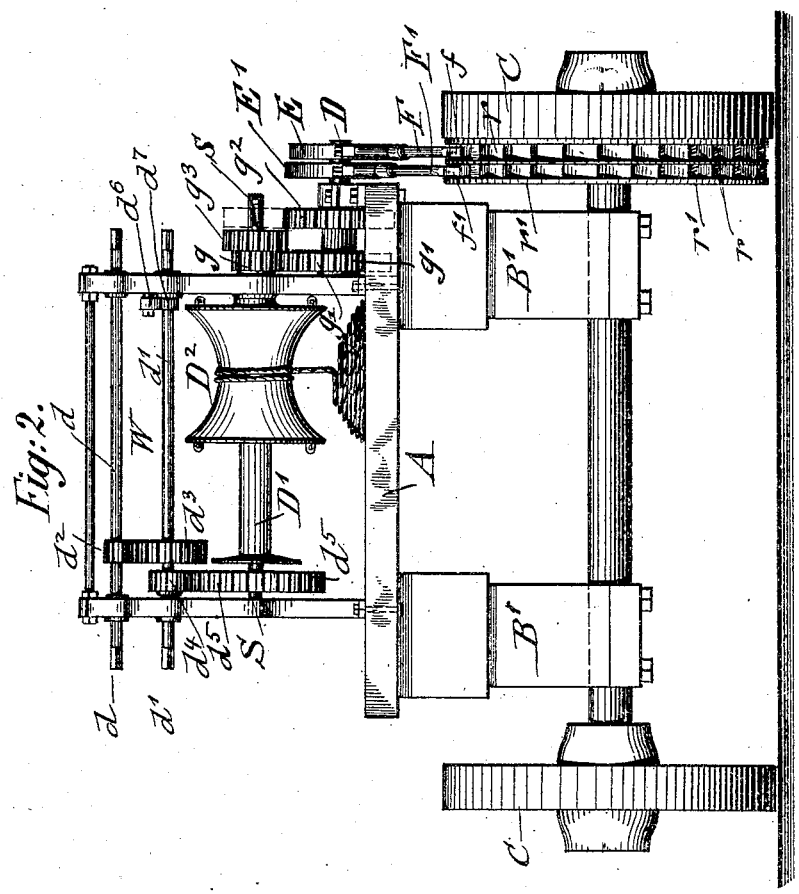

GUSTAV BENISCH, OF NEW YORK, N. Y.

TRUCK FOR MOVING HEAVY LOADS.

No. 796,795. Specification of Letters Patent. Patented Aug. 8, 1905.

Application filed February 4, 1905. Serial No. 244,137.

*To all whom it may concern:*

Be it known that I, GUSTAV BENISCH, a citizen of the United States, residing in New York, borough of Brooklyn, in the State of New York, have invented certain new and useful Improvements in Trucks for Moving Heavy Loads, of which the following is a specification.

This invention relates to improvements in trucks for moving heavy loads, such as granite or marble blocks and the like, without requiring a large number of teams, which heretofore were necessary for moving such loads from the landing-pier or other point to the place of use, and by which the truck is enabled to pass with the load around angles of the road without requiring a special tackle arrangement for this purpose; and the invention relates more specifically to an attachment for the truck by which the same can be started and moved over steep grades on the road with great facility; and for this purpose the invention consists of a truck which is provided at its front part with a windlass, a cam-shaft operated by intermediate gearing from the drum-shaft of the windlass, ratchet-wheels attached to one of the rear wheels of the truck, and connecting-rods between the cam-shaft and the ratchet-wheels, said connecting-rods being provided with pawls at the ends for engaging said ratchet-wheels.

The invention consists, further, of a change-gear between the windlass and the cam-shaft for changing the speed imparted to the starting and moving devices; and the invention consists, lastly, of certain details of construction and combinations of parts, which will be fully described hereinafter and finally pointed out in the claims.

In the accompanying drawings, Figure 1 is a side elevation of my improved truck for moving heavy loads, and Fig. 2 is a rear elevation of the same.

Similar letters of reference indicate corresponding parts.

Referring to the drawings, A represents the body of my improved truck for moving heavy loads. B represents the front wheels and C the rear wheel of the same. Between the body A and the axle of the front wheels are interposed the supporting-springs and the usual fifth-wheel, while between the axle and the rear part of the truck are interposed bolsters B' of the construction such as are used in trucks for moving heavy loads. At the front end of the wagon-body A is arranged a windlass W, of any approved construction, which may be driven by means of hand-cranks applied to the shafts $d$ $d'$ of the transmitting-gears $d^2$ $d^3$ $d^4$ $d^5$, by which rotary motion is imparted to the drum-shaft S.

From the drum-shaft S of the windlass W rotary motion is transmitted by means of intermediate gearing $g$ $g'$ $g^2$ to a cam-shaft D, which is supported in suitable bearings on the front end of the truck at one side of the windlass. To the cam-shaft D are keyed two eccentrics E E', which are arranged in diametrically opposite direction to each other on the square end of the shaft. To the eccentrics E E' are strapped two connecting-rods F F', which are provided at their ends with pawls $f$ $f'$ and at intermediate points with turnbuckles $f^2$, by which the length of each connecting-rod can be readily adjusted, so as to engage the teeth of two ratchet-wheels $r$ $r'$, that are attached to the inner side of one of the rear wheels C, the pawl of one connecting-rod engaging the teeth of one of the ratchet-wheels and the pawl of the other rod the adjacent ratchet-wheel.

When the drum-shaft of the windlass is rotated by hand or otherwise, the cam-shaft is revolved by the intermediate gearing, so that alternately each connecting-rod is moved by its eccentric in forward direction, and as the pawls at the ends of the connecting-rods F F' engage the ratchet-wheels $r$ $r'$ the rear wheels are turned and the load moved in forward direction. While one connecting-rod is moved forward, the other is moved backward, so as to engage with the next adjacent tooth of its ratchet-wheel while the other connecting-rod is pulling the load by its action on its ratchet-wheel, so that there is no chance for the load to slip backward. When great traction is desired, the cam-shaft D is continued transversely across to the other side of the windlass and connected with it by a similar attachment, consisting of eccentrics, connecting-rods, and ratchet-wheels on the opposite rear wheel.

For obtaining different speeds the gear-wheel $g$ and the auxiliary gear-wheel $g^3$ are splined to the end of the drum-shaft, the gear-wheel $g$ being smaller and the gear-wheel $g^3$ being larger. By shifting the gears $g$ $g^3$ so that the small one, $g$, intermeshes with the gear-wheel $g'$ or the larger one, $g^3$, with the gear-wheel $g^2$ on the cam-shaft D the speed of the cam-shaft can be changed according to the proportion between the teeth of the transmitting-gears.

On the drum-shaft S is placed a drum D' and a winch-head D², which is cast in halves and bolted together over drum D, one end of said winch-head being bolted to the flange of the drum. Owing to the difference of diameter between the drum and winch-head, the leverage on the rear wheel or wheels is correspondingly changed, according as the starting-rope is passed around the drum or the winch-head. By means of the sliding gears $g$ $g^3$ and the drum and winch-head four different speed-changes are obtained, and if it should be desired to further increase the number of speeds the eccentrics E E' may be removed from shaft D and other eccentrics slid on the same of different degrees of eccentricity, so that four, eight, twelve, sixteen, &c., different speeds may be obtained, as desired.

When the truck is to be started, the starting is assisted by placing the cranks on opposite sides of the windlass-shaft and turning the same, so that through the gear-wheels and transmitting devices the rear wheels of the truck are rotated, or motion may be transmitted directly to the drum-shaft S by placing a coil of rope on the body or deck A of the truck near the windlass and passing one end of the rope several times around the drum or winch-head, after which this end of the rope is attached to a pair of whiffletrees drawn by a team of horses. As the horses pull on the rope the operator on the truck pays out the same and the friction of the rope on the drum or windlass turns the drum-shaft, so that the same by the intermediate transmitting mechanism operates the connecting-rods and turns the rear wheels. The team pulls thereby straight ahead in the same direction as the truck. By extending the rope around the winch-head and over the body or deck the backward pulling of the team on the rope produces likewise the forward motion of the truck by the attachment described. The team may pull at an angle to the direction of motion of the truck by means of a snatch-block fastened to the deck of the truck. When power is available, a motor can be used for driving the drum-shaft by which the use of horses may be dispensed with. Backward movement of the drum and gears is prevented by a pawl-and-ratchet mechanism $d^6$ $d^7$ for locking the shaft $d'$.

The advantages of my improved truck for moving heavy loads are as follows:

First. Ordinarily when it is desired to move a heavy load over a short distance the truck often requires ten teams on the level parts of the road and as many as twenty teams on steep grades, while five or six teams are required on a very hard road with a slight downgrade. By the use of the improved starting and moving attachment the load can be drawn at all times with a single team at different speeds, according to the grade and nature of the ground. A considerable saving in men and teams is thereby obtained.

Second. In case a heavy load is to be moved over a greater distance the entire load is pulled by means of teams and without leverage, in which case the attachment is used only as an auxiliary for starting the truck. By this means instead of using twenty teams for pulling the load the truck can be drawn with ten teams, in addition to an extra team sent along to start the load, or if this should not be desired the load can be started by hand by means of the crank-shafts of the windlass, for the reason that it requires much more power to start the load and get the teams to pull than to keep the load moving.

Third. In some cases it is necessary to draw heavy loads around sharp curves and at the same time over steep grades. In this case it is impossible to hitch enough teams to the truck to pull the load, as it is impossible to turn in the road with the same. In such cases the truck is moved solely by the attachment, being "warped" by the rope, so to say, around the curve or over the steep portion of the road.

By the attachment the load is moved slowly over the ground, so as to eliminate dangerous vibration. The absence of vibration while moving the load permits the use of a truck without springs, while lasting much longer, as the wear and tear on the truck is greatly diminished.

Having thus described my invention, I claim as new and desire to secure by Letters Patent—

1. In a truck for moving heavy loads, the combination with a truck-body, of a windlass supported on the same, a cam-shaft, intermediate gearing between the windlass and cam-shaft for rotating the latter, eccentrics on the cam-shaft, ratchet-wheels attached to the rear wheel of the truck, and connecting-rods having pawls at their rear ends interposed between the eccentrics and the ratchet-wheels.

2. In a truck for moving heavy loads, the combination, with a truck-body, of a windlass supported at the front end of the same, means for operating the windlass, a cam-shaft supported on the truck-body, intermediate gearing between the windlass and the cam-shaft, eccentrics on the cam-shaft, connecting-rods strapped to said eccentrics and provided with pawls on their opposite ends, and ratchet-wheels on one of the rear wheels of the truck engaged by the pawls on the rear ends of the connecting-rods for starting and moving the load.

3. In a truck for moving heavy loads, the combination, with the truck-body, of a windlass at the front end of the same, means for actuating said windlass, a cam-shaft, an intermediate change-gear between the windlass and cam-shaft, eccentrics on the cam-shaft, a ratchet mechanism on one of the rear wheels of the truck, and intermediate connecting-rods engaging said ratchet mechanism between the eccentrics and ratchet mechanism.

4. In a truck for moving heavy loads, the combination, with the truck-body, of a windlass at the front end of the same, said windlass being provided with a drum-shaft carrying a drum and a winch-head, means for actuating the drum-shaft, a cam-shaft, motion-transmitting mechanism between the drum-shaft and cam-shaft, eccentrics on the cam-shaft, ratchet-wheels on one of the rear wheels, and connecting-rods having pawls at their rear ends for engaging the ratchet-wheels.

In testimony that I claim the foregoing as my invention I have signed my name in presence of two subscribing witnesses.

GUSTAV BENISCH.

Witnesses:
   PAUL GOEPEL,
   HENRY J. SUHRBIER.